United States Patent [19]

Lavie

[11] Patent Number: 5,740,682
[45] Date of Patent: Apr. 21, 1998

[54] METHOD FOR THE RECOVERY OF ORGANIC VAPORS

[75] Inventor: Ram Lavie, 33 Italia Street, Haifa 34987, Israel

[73] Assignees: Ram Lavie, Haifa; Technion Research and Development Foundation Ltd., Technion, both of Israel

[21] Appl. No.: 376,933

[22] Filed: Jan. 23, 1995

[30] Foreign Application Priority Data

Feb. 13, 1994 [IL] Israel .................................. 108626

[51] Int. Cl.[6] .................................................. F25J 3/00
[52] U.S. Cl. .................................. 62/617; 62/903; 62/908
[58] Field of Search ........................... 62/11, 18; 95/141, 95/113; 96/125

[56] References Cited

U.S. PATENT DOCUMENTS

| | | | |
|---|---|---|---|
| 3,926,230 | 12/1975 | Stary et al. | 141/45 |
| 4,012,847 | 3/1977 | Rand | 34/75 |
| 4,175,932 | 11/1979 | Durr et al. | 95/142 |
| 4,283,212 | 8/1981 | Graham et al. | 62/18 |
| 4,292,020 | 9/1981 | Hirt | 431/5 |
| 4,401,450 | 8/1983 | Schramm | 62/13 |
| 4,421,532 | 12/1983 | Sacchetti et al. | 95/141 X |
| 4,661,133 | 4/1987 | Lavie | 62/18 |
| 4,698,073 | 10/1987 | Rohde et al. | 62/18 X |
| 4,738,694 | 4/1988 | Godino et al. | 62/18 X |
| 4,966,611 | 10/1990 | Schumacher et al. | 95/141 X |
| 5,006,138 | 4/1991 | Hewitt | 62/18 |
| 5,069,038 | 12/1991 | Pienze | 62/18 |
| 5,152,812 | 10/1992 | Kovach | 95/141 X |
| 5,187,131 | 2/1993 | Tiggelbeck et al. | 62/18 X |
| 5,220,796 | 6/1993 | Kearns | 62/18 |
| 5,345,771 | 9/1994 | Dinsmore | 62/18 |
| 5,389,125 | 2/1995 | Thayer et al. | 96/122 X |
| 5,389,513 | 2/1995 | Klobucar | 62/18 |

FOREIGN PATENT DOCUMENTS

| | | | |
|---|---|---|---|
| 2069380 | 12/1992 | Canada | 62/18 |

*Primary Examiner*—Christopher Kilner
*Attorney, Agent, or Firm*—Cowan, Liebowitz & Latman, P.C.

[57] ABSTRACT

A method for the recovery of fugitive volatile organic vapors which comprises the steps of: (a) compressing said vapors to a pressure of at least 200 kpa; (b) feeding the hot compressed vapors to the desorption step of a Heat-Mass-Exchange (HME) system; (c) cooling the effluent resulted from the desorption step to the ambient temperature and separating out the condensed liquid obtained and (d) feeding the residual cold vapor phase, after the separation of the condensed liquid, to the adsorption step of said HME system, thus recovering the fugitive organic vapors. According to a preferred embodiment, the compressed vapors resulted from step (b) are at a temperature in the range of between 80° to 150° C., which may be reached by an external heating and the effluent resulted from the desorption step (c) is cooled at a temperature of about 5° C.

8 Claims, 1 Drawing Sheet

METHOD FOR THE RECOVERY OF ORGANIC VAPORS

The present invention relates to a method for the recovery of volative vapours from fugitive streams. More particularly, the invention relates to a simple method and system for the recovery of organic vapors, having a relatively high vapor pressure at atmospheric pressure, from organic vapor laden gaseous streams.

BACKGROUND OF THE INVENTION

Fugitive organic vapors are now considered to be precursors to ground-level ozone, a major factor in the formation of smog. Accordingly, a maximum reduction in the emission of volatile organic compounds is a long-felt need in these days. The stringent environment demands of the respective authorities, impose severe measures to many industries where volatile organic vapours result and have to be recovered mainly not for their actual value. As known, vapors of organic solvents can be adsorbed on charcoal. When a recovery from a mixture with air is required, the following additional stages are involved: desorption of the loaded charcoal with steam or heated water, condensation of the water mixture from the desorption stage and separation of the solvent from the water. Among the disadvantages of this method it should be mentioned the following: always some of the charcoal after use has to be discarded thus creating another environmental problem, a make-up of charcoal is imposed and the recovery of the vapors adsorbed in the charcoal is always only partially.

According to the U.S. Pat. No. 3,926,230, a system for recovery of flammable vapors is described. According to this method, the vapors are adsorbed on charcoal and then mixed with air to drive a combustion chamber. Based on the same approach of burning the volatile flammable vapors, the U.S. Pat. No. 4,292,020, describes a method and apparatus for the removal of gasoline vapor. According to this patent, the gasoline vapors are collected through a conduct and combusted. Although the method avoids the pollution by the volatile organic solvents vapors, it does produce other undesirable factors to the environment.

In the U.S. Pat. No. 4,012,847, a solvent recovery system is described. The solvent as resulted from a process, is conveyed into a chamber where the vapors are recovered in two stages: first by a chiller and further by an air circulation system which comprises an adsorber. In the U.S. Pat. No. 4,175,932 a method is described for a continuous recovery of organic vapors from gases, by their adsorption on charcoal followed by desorption in steam-heated water and subsequently separating the water from the liquid solvent.

The above methods, although are succeeding to recover a portion of the volatile organic solvent vapors, but they still do not provide a total recovery thereof and thus do not result a complete avoidance of pollution.

The Clean Air Act Amendment of 1990 (CAAA) issued demands for a drastic reduction of the volatile organic compounds in the surrounding, fact which imposes new approaches for this purpose.

It is an object of the present invention to provide a simple method for a substantial recovery of volatile organic solvent vapors from relatively uncondensable gas streams such as from natural gas, or from process streams in the petrochemical industry. It is another object of the present invention to provide a simple method for a substantially recovery of volatile organic solvent vapors having a relatively high vapor pressure at atmospheric pressure from a fugitive stream, without causing any related pollution. It is yet another object of the present invention to provide a simple method for a total recovery of volatile organic solvent vapors from a fugitive stream, which can be fully reused, without requiring an extreme chilling which would cause fouling with ice of heat transfer surfaces.

BRIEF DESCRIPTION OF THE INVENTION.

The invention relates to a method for the recovery of volatile organic vapors (hereafter referred to VOC) which comprises the steps of: (a) compressing the vapors to a pressure of at least 200 kpa; (b) feeding the hot compressed vapors to the desorption step of a Heat-Mass-Exchange (HME) system; (c) cooling the effluent resulted from the desorption step to the ambient temperature and separating out the condensed liquid obtained, and (d) feeding the residual cold vapor phase after the separation the condensed liquid to the adsorption step of said HME system. In this manner the vapors which are substantially free from the organic vapors, may be collected or reutilized. According to a most preferred embodiment, the effluent resulted from the desorption step (in step c) is cooled at a temperature of about 5° C.

DETAILED DESCRIPTION OF THE INVENTION

Figure 1:
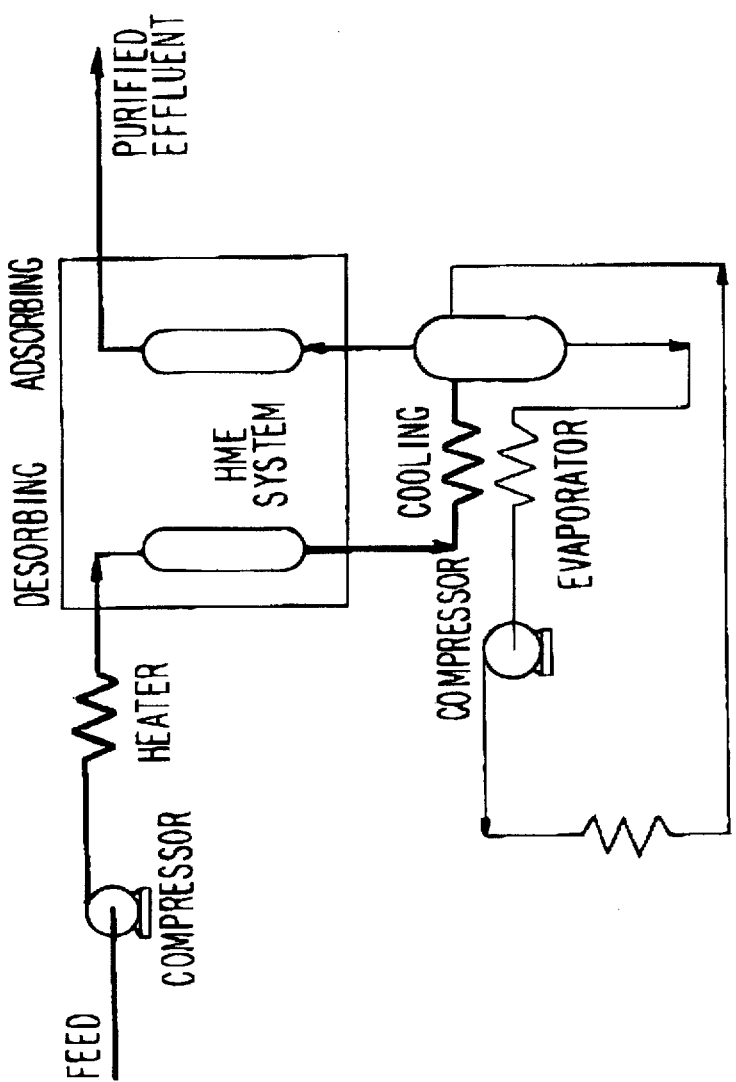

In our prior U.S. Pat. No. 4,661,133, a method for Heat and Mass Exchange (HME) between two streams of similar compositions and of different temperatures was described. This system was found also useful for air drying. It has now been found that this method can be most suitable for the recovery of organic vapors having a relatively high vapor pressure at atmospheric pressure. In this manner, the method will permit a substantial recovery of the organic vapors while, at the same time, purifying the gaseous effluent at relatively mild operating conditions. When applied to an effluent that is released to the atmosphere, it will avoid the pollution by said fugitive organic solvents. Although the method is most suitable for a recovery of vapors having a relatively high vapor pressure resulted in a chemical plant, it may also be used for the recovery of fugitive gasoline vapors that are emitted to the atmosphere when filling a fuel tank from a vehicle at a gas station.

In the first step, a stream with vapors of a fugitive volatile organic vapors is compressed to a pressure of at least 200 kpa and preferably at about 700 kpa. When said stream contains also some oxygen, which will present a danger of ignition or explosion, it is necessary that its saturation with the volatile organic compound vapors should be beyond the upper explosive limit. This procedure is more convenient than the known methods for avoiding the processing of an explosive mixture which require a prior reduction of the volatile organic compounds vapor content to below the lower explosive limit.

In the second step, the compressed vapors having a temperature of above 80° C. and preferably at about 150° C., reached if necessary by external heating, is fed to the desorption step of a Heat-Mass-Exchange rapid drier, to remove the previously adsorbed vapors. In this manner, the adsorbent bed, saturated with said vapors will be regenerated.

In the third step, the resulted effluent from the desorption step, is cooled to an ambient temperature and most preferably to about 5° C., whereby the vapors will be condensed and the respective liquid separated out.

In the last step, the residual cold vapor phase is fed to the adsorption step of the HME system. In this manner, the adsorbent bed will retain the remaining vapors of volatile organic compound thus yielding a substantially pure effluent which can be safely released to the atmosphere. Also, the cold expanded liquid from the recovered volatile organic compound exchanges heat with the cooled effluent from the desorption step of the HME system.

An important advantage of the method according to the present invention is the fact that the increased concentration of the stream resulted from the HME unit, facilitates its condensation, thus reducing the energy required to recover the vapor as a useful liquid form which could be readily used. In this manner, the result will be a substantial removal and recovery of the vapor to an extent which exceeds by far what could be attained by a direct condensation at the same temperature and pressure. The method according to the present invention is characterized by its simplicity, compactness and reduced equipment required for carrying out the method. It also possesses the advantage that the condensation of the vapors is carried out at a moderate temperature and pressure due to the use of the Heat Mass Exchange unit. The invention has also an advantage concerning safety since it will minimize the release of potentially flammable materials and by the compression of the gas mixture at above the upper explosion limit.

For a better understanding of the invention, the attached FIG. 1, illustrates schematically a flowsheet of the method and a typical Example is hereafter described. Although this Example deals with recovery of fugitive gasoline vapors, as encountered in a gas station, it should be understood that the same is applicable in any chemical plant where volatile organic compound vapors have to be recovered.

EXAMPLE 1 in a gas station where refueling of cars at an extent of 100 liters per minute of fugitive vapors, comprising 50% air and 50% vapors of gasoline, consisting of light hydrocarbons, were collected. In order to avoid a possible reach of the explosive range, the vapors were passed through a layer of condensed recovered gasoline at the bottom of a small suction vessel. The vapors obtained were conveyed to a compressor, which raised the pressure and temperature of the stream to a 700 kps and 150° C. This hot compressed stream was fed to the top of regeneration step of a Heat Mass Exchange system which contained two 5 liter beds of active carbon beads. The effluent of the regeneration step was cooled by convention to a temperature of about 25° C. and then further cooled to about 5° C.

An amount of 200 g/h of liquid gasoline condensed. The separated liquid expanded to the atmospheric suction pressure and then reheated to about 25° C. by a heat exchange with the regenerating bed effluent and recycled to the suction vessel. The excess liquid gasoline in the suction vessel, drains into the station's main gasoline storage tank without a substantial change in its composition. The separated cold gas phase was fed to the bottom of the adsorption step of the Heat Mass Exchange unit. It was found that the effluent of the adsorption step went out substantially gasoline-free, and consisted of 50 l/min of air containing only 40 ppm by weight of gasoline vapors.

While the invention has been described by the above specific Example, it will be understood however, that although it may describe in detail certain preferred operating variables and properties within the contemplation of the invention, they are provided primarily for purposes of illustration and the invention in its broader aspects is not limited thereto.

I claim:

1. A method for the recovery of fugitive volatile organic vapors which comprises the steps of:

(a) compressing said vapors to a pressure of at least 200 kpa;

(b) feeding the hot compressed vapors to the desorption step of a Heat-Mass-Exchange (HME) system;

(c) cooling the effluent resulting from the desorption step to ambient temperature and separating out the condensed liquid obtained; and (d) feeding the residual cold vapor phase, after the separation of the condensed liquid, to the adsorption step of said HME system to recover the fugitive organic vapors, wherein the cold expanded volatile organic compound exchanges heat with the cooled effluent from the desorption step of the MEH system.

2. The method according to claim 1, wherein the fugitive organic vapors are compressed in step (a) to a pressure of about 700 kpa.

3. The method according to claim 1, wherein the compressed vapors resulted from step (b) are at a temperature in the range of 80° C. to 150° C.

4. The method according to claim 3, wherein said temperature range is reached by external heating.

5. The method according to claim 1, wherein the effluent resulted from the desorption step (c), is cooled at a temperature of about 5° C.

6. The method according to claim 1, applicable to fugitive volatile organic vapors containing some oxygen, wherein the saturation with the volatile organic vapors is beyond the upper explosive limit.

7. The method according to claim 1, applicable for the recovery of fugitive gasoline vapors.

8. The method according to claim 1, applicable for the recovery of vapors having a relatively high vapor pressure from a chemical plant.

* * * * *